(12) United States Patent
Lipovac

(10) Patent No.: US 6,391,134 B1
(45) Date of Patent: May 21, 2002

(54) TIRE WITH SIDEWALL HAVING INTEGRAL APPLIQUE OVER SPACED APART SCUFF RESISTANT RIBS

(75) Inventor: Joseph Edward Lipovac, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 08/725,212

(22) Filed: Sep. 24, 1996

Related U.S. Application Data

(63) Continuation of application No. 08/510,509, filed on Aug. 2, 1995, now abandoned, which is a continuation of application No. 08/264,867, filed on Jun. 24, 1994, now abandoned, which is a continuation-in-part of application No. 08/209,586, filed on Mar. 14, 1994.

(51) Int. Cl.$^7$ .............................................. B60C 13/00
(52) U.S. Cl. ........................ 156/116; 156/523; 156/524; 156/DIG. 12
(58) Field of Search ........................... 156/116; 152/523, 152/524, DIG. 12

(56) References Cited

U.S. PATENT DOCUMENTS

| 2,188,866 A | * | 1/1940 | Poschel |
| 2,761,489 A | * | 9/1956 | Kraft |
| 4,252,589 A | * | 2/1981 | Hayakawa et al. |
| 4,967,818 A | * | 11/1990 | Gartland et al. |
| 5,047,110 A | * | 9/1991 | Bryant et al. |
| 5,296,077 A | * | 3/1994 | Bohm et al. |

FOREIGN PATENT DOCUMENTS

JP  60187539  * 9/1985

\* cited by examiner

Primary Examiner—Sam Chuan Yao
(74) Attorney, Agent, or Firm—Henry C. Young, Jr.

(57) ABSTRACT

A cured tire having an integral adhered applique both cured in the same cure step in a mold to form spaced apart scuff resistant ribs under the applique on the sidewall of the tire, said applique a thin gauge non-staining compatible rubber backing adhered to said sidewall, a highly stable rubberized ink design adhered to said backing and covered with a removable film before and at the time of removal of the tire from the mold.

7 Claims, 6 Drawing Sheets

TIRE WITH SIDEWALL HAVING INTEGRAL APPLIQUE OVER SPACED APART SCUFF RESISTANT RIBS

This is a Continuation of application Ser. No. 08/510,509, filed on Aug. 2, 1995 now abandoned, which is a continuation of Ser. No. 08/264,867, filed Jun. 24, 1994 now abandoned. The application filed on Aug. 2, 1995 is presently pending.

This is a continuation-in-part of patent application Ser. No. 08/209,586 filed Mar. 14, 1994 in the name of Joseph Edward Lipovac.

FIELD OF INVENTION

This invention relates to a process for placing appliques having markings such as white sidewalls, designs, letters, logos, trademarks, decals, even bar codes, etc. on a rubber substrate, which is given enhance stability by curing said appliques with or to the rubber substrate, preferably during the cured shaping of the substrate, such as a tire and said resulting product. Also, the applique can have scuff ribs molded therein. More particularly, this invention relates to a more economical method of making a tire, specifically a racing or airplane tire, having a precisely positioned applique being colored on the normal black or white sidewall to give a tire having clear colored precise demarcation lines to give a low defect or blemish tire and with scuff ribs to protect the applique. Also, this invention is useful for placing appliques on rubber hose, belts and other rubber products.

Another embodiment of this invention involves use of a specific mold having grooves therein to mold scuff ribs or bars at least beneath the surface of the cured applique on the cured tire.

BACKGROUND OF THE INVENTION

White sidewall tires are very popular with car makers. Tires having other types of appliques on the sidewalls thereof, such as lettering, logos, decals, or bar codes and the like, are also very popular. However, the construction of tires having white sidewalls or decorative appliques on the sidewall thereof is a complicated procedure. It generally involves the coextrusion of a black sidewall rubber with a white sidewall rubber and laminating a protective cover strip over the white rubber to form a sidewall preassembly. This tire sidewall preassembly is then applied in sequence with the other required tire components to the tire building drum to form a green or uncured tire. The green tire is then typically cured in a tire press, with the desired applique being formed by the grooves in the tire mold. After the tire has been cured, it is carefully ground and buffed to expose the decorative applique which was previously covered and protected by the cover strip.

Coextrusion is a complicated process which involves the utilization of sophisticated equipment and a large number of profile dies. The grinding and buffing step which is required to remove the cover strip is also complicated and labor intensive. These additional steps which are required in building tires having decorative appliques on a sidewall thereof adds significantly to the cost of building the tire.

In conventional white sidewall tires, the white rubber component represents a very substantial portion of the sidewall. However, it is desirable for tires to have thin sidewalls in order to attain desired performance characteristics. Accordingly, the decorative applique on the sidewall of a tire should be as thin as possible. Nevertheless, certain production and performance criteria has limited the degree to which the thickness of sidewall applique can be reduced.

There are additional problems associated with tires having decorative applique on a sidewall thereof which are built using standard techniques. For instance, such tires have more blemishes, imperfections, and voids in the sidewall area as compared to black sidewall tires. Additionally, problems associated with the white sidewall splice opening sometimes also occur. Misalignment of the white sidewall preassembly relative to mold grooves is a frequently encountered problem which leads to blemished tires. The grinding procedure used in building standard tires having decorative appliques on a sidewall thereof sometimes leads to the formation of surface crack sites.

For the aforementioned reasons, tire having decorative appliques on a sidewall thereof and the conventional procedures used in building such tires leave much to be desired. To obviate these shortcomings associated with standard techniques for building tires having decorative appliques on a sidewall thereof, it has been proposed to replace the previously known sidewall decorative features with appliques which are painted on to conventional black wall tires. However, painting designs on to the sidewall of tires has not proven to be a satisfactory answer to the problem. This is largely due to the fact that designs which are painted on are quite thin and can be easily damaged by scraping, scuffing and the like.

The concept of applying premolded tire sidewall appliques to standard black wall tires has also been proposed. Difficulties have been encountered with maintaining adequate adhesion between the sidewall applique and the tire. Also, tires made utilizing such techniques typically have inferior scuff resistance such that the applique fails at the interface.

Over a dozen years ago Hayakama, et al issued U.S. Pat. No. 4,252,589 assigned to Bridgestone Tire Company, Limited, that set forth the prior art problems of making appliques containing tires as applied to automatic tire building operations and specifically summarizes the inoperatability in three numbered statements. Then, Hayakama, et al. provided a solution that required the thin rubber sheets to be a partially vulcanized rubber sheets having 50–80% vulcanization degree that was further vulcanized.

Another problem associated with providing appliques with cured molded rubber products, viz, tires, is the applique tends to be abraded in use to leave the applique disfigured with an unattractive appearance.

DESCRIPTION OF THE INVENTION

In general, the tire without an applique is produced on the conventional tire building drum or cylindrical former by assembling the parts or plies, whether bias or radial one, to leave the green tire case thereon. Then, the green tire case is placed in a mold, inflated and cured at about 250° F. to 450° F. for about 15 to about 45 minutes to give a standard black tire.

In this invention the applique preferably is applied while the green tire case is still on the drum and when the tire is a radial one, it is preferred to apply the applique to the green tire case while the drum is extended to at least partial inflate or expand the case in tread area to cause the sidewalls to slope toward the tread from the bead. The applique includes a film carrier having a rubberized ink design, decal, letters, symbols, related design pattern, or bar code printed thereon or to give a pleasing message. A thin gauge non-staining rubber backing is laminated to the message side of said film to give a laminate. The lamination is preferably accomplished by passing the film with the thin gauge non-staining rubber backing through a pinch roll or similar pressure means to cause the film and backing to adhere to each other sufficient to withstand the curing step for the tire.

A green tire case is built on a tire drum by the tire builder assembling the various parts such as plies, i.e., tread and sidewalls with the desired reinforcing such as steel, polyester, polyamide, etc. cords or wires with the beads in place.

Then preferably with the drum activated to cause the tread section of the case to move outward to give the sidewalls a slope to the beads, the applique is precisely positioned on the green tire case. It is preferred to use the component lights on the tire building drum to indicate the position on the green tire case where the tire builder is to locate the applique. The adjustable component lights project on the green tire case in a vertical and horizontal plane to form a point or place to locate the applique. Preferably, the applique has a mark such as a small v-marking center of the applique to facilitate indicating where the applique is placed relative to point of light. Then the applique with the v-mark, for instance, and light in coincident is spread on the case as shown in the drawings and stitched down.

With the applique laminate located and stitched to the green tire case, the green tire case is removed from the building drum and placed in a toroid mold to be inflated by pressurizing the mold bladder and cured at usually cure conditions, for instance, about 250 to 400° F. for about 15 to about 60 minutes depending on curative in the tire case rubber.

When the cured tire is removed from the mold, the applique has clear, crisp pattern lines and is precisely located on the tire to advantageously show the visual message for instance, a bar code or brand, on the tire. Also, this method gives letters with sharp edges and excellent half tones with freedom from filled in bars or space in letters such as "A, D, O. and R". The rubberized ink applique has great durability and resistance to curbing. These tires with appliques, for instance the trademark letters of the manufacture, can be made cheaper by applying the appliques to the green tire case before placing the green tire case in the mold. Lettered tires made according to this invention can be readily seen on a racing or airplane tire and affords great visibility on tires and permits their advertising and identification to those viewing the tires.

Also, it was discovered that the inside surface of the mold could have engraved grooves of scuff ribs or bars therein, preferably partially circumferentially inside the wall, to give a cured rubber article whose applique could be abraded, preferably in use, to give a pleasing appearance primarily due to location of the scuff bars under the applique.

For instance, a racing tire receives harsh treatment in handling in the pits where the tire is dragged or pushed over the surface such as concrete of the pit. This action causes the applique letters and design to be abraded or scuffed away to produce an unsightly appearing appliques. By placing a series of small scuff ribs beneath the applique, it was unexpectedly discovered that the destruction of the appearance was limited and, in some cases, could even be enhanced. For instance, the letters or design over the scuff ribs or bars can be removed by scuffing to give an internal curve appearance which some on viewing refers to as a racy effect or tends to give the appearance the tire is going faster. This is an unobvious effect not expected from curved ribs essentially 0.1 to 0.015 inches in height and an arc length 0.05 to 0.07 inches at the surface. It is found that the ribs should preferably be about 0.3 to 0.4 inches apart.

Further, it was discovered that the grooves could be placed inside the tire surface essentially entirely around the 360° surface. Further it was amazing to discover the ribs produced in the tire sidewall was not offensive or destructive to the appearance of the freshly molded tire. This discovery lets the tire molder place the green tire in mold without having to worry about where the applique is located in the mold or that a blemish will be caused in the finished tire.

THE DRAWINGS

For a better understanding and visualizing of the invention, reference is taken to the accompanying drawings, wherein FIG. 1 is a cross-section through one embodiment of the laminate prior to being adhered to the green tire case;

EXAMPLE I

Figure 1:
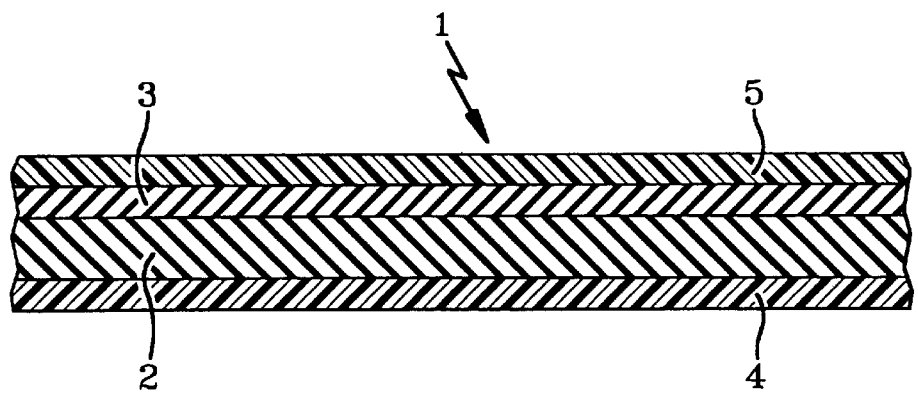

Appliques of GOODYEAR and EAGLE were made using for a film carrier an acetate film or a polyester film such as mylar in the shape or design of the applique on the tire by printing the names on the film carrier with a rubberized ink supplied by Akron Paint & Varnish, Akron, Ohio and dried. Preferably, the film has a small v-notch or other indicator in the end or middle thereof for ease of positioning the applique. Then, a thin gauge (about 0.025 to 0.050 inches) non-staining rubber with preferably a polyolefin film thereon is applied over the rubberized ink on the film carrier by pressing them together, preferably by passing them through a pinch roll. The adhesion between the film carrier, the rubberized ink and rubber backing during the curing process make the applique an integral part of the tire during curing but the film may be stripped from the tire before it is put to use. The bond of the carrier and rubberized ink to the rubber backing prevents the letters and design lines from being distorted during the cure cycle. For instance, when the letters are printed directly onto the rubber and cured without the film backing, the letters and lines are smeared and distorted.

The carrier film on the tire or rubber part appears to prevent distortions by rubber flow and pantographing of the tire during the curing process. Thus, the letter edges or designs remain sharp and crisp even when cured over builder and component splices, mold stamping and mold scuff ribs. Thus, this invention solves these problems.

Distortative print is desirable in a number of processes, for instant, it is widely used in labeling tin cans or aluminum cans as it allows the plate to be printed before it is shaped. The printed plate is shaped by stamping or other means to bring the printing into a regular pattern or orientation that is easily and readily read. Unfortunately, heretofore, distortative printing has not been usable in making tires but an embodiment of this invention permits distortative printing to be used in tire making, particularly to advantage in making radial tires.

In this embodiment the letter, symbols or decal patterns are printed with rubberized ink onto a non-staining rubber gum strip in an irregular pattern. The exact irregular pattern to be used may be determined by a well known computer program for distortative printing, specifically the software "Step Off Printing" by Corel Draw like is practiced in distortative printing of aluminum plate and can be used here.

The letters or decal printed with rubberized ink and dried on the gum strip, preferably about 0.025 to about 0.050 inches thick are applied to the sidewall of the tire case preferably while the tire case lies flat on the building drum. Then as the green tire case is expanded on the building drum such as when beads and the tread ply are added, the letters and design become nearly completely oriented during the completion of the building cycle. Then before removing the green tire case from the building drum, a piece of film, usually of acetate or polyester, viz. mylar is hand stitched over the decal usually as the builder rotates the drum by feet pedals (not shown).

Then the drum is collapsed and the green tire case is removed and placed in the toroidal mold. The green tire case in the toroidal mold is inflated and cured to fully orientate the letters and design of the decal on the tire. The film over the letters may be removed, where desired, prior to being used.

Referring specifically to FIG. 1, the laminate 1 is shown as a thin-gauge rubberized backing or member 2 which may have a release member 4 preferably of gum polyolefin releasably adhered thereto to permit the laminates to be stored in piles or rolls until needed. Numerical 3 is the color or design feature of the applique of rubberized ink covered with a protective film 5.

The rubberized ink is a commercial ink made with a rubber base with a pigment dispersed in a solvent, preferably paraffinic with sufficient ketones and related solvents to render the ink stable and capable to resist decoloration for 16 hours or more in an ultra-violet weatherometer. The pattern also can be applied by printing via screening, guarve or other well known techniques. The acetate films are polymers of acrylate acetates or vinyl acetate, or related unsaturated acetates that give films that can be printed with rubberized ink and sufficient compatibility and tacky for ink and the rubber backing. The polyester film usually is ethylene adipate or a $C_3$ to $C_4$ glycol adipate or their mixtures. Also, it is some times desirable to coat the side of the film to receive rubberized ink print with a slight coat of release agent such as a silicone, in a manner well known to those in adhesive release business to control tact adhesion. The polyester films of about 0.022 inches thick is highly desirable as it resist distortation of the printing on rubber backing. Generally the film of about 0.010 to about 0.030 inches thick can be used or slightly thicker depending on the flexibility of the film material.

The thin gauge non-staining rubber usually of 0.02 to 0.06 but preferably 0.025 to 0.050 inches is shaped or cut into strips or other shapes used in decorating tires. The rubber backing, rubberized ink and rubber compound of tire sidewall must be compatible, that is free of any tendency to separate during cure or in-service on a road test or on the road. The thin non-staining rubber backing preferably depends on the vulcanizing compounds in the compounded rubber of the sidewall to cure the backing strip to sidewall of the tire. Also, the non-staining stock should withstand exposure in an ultra-violet weatherometer for 16 hours plus without exhibiting signs of staining. Also, it is a preferenced that the virgin rubber backing be compounded with sufficient carbon black or $TiO_2$ or related filler usually about 10 to about 100 and, preferably about 25 to about 60, parts per hundred of rubber to block excessive migration of staining curative from the tire sidewall to result in preventing discoloration of the design but gives sufficient migration to effect cure of the backing. The well-known non-staining curative agents are preferred in this invention. Normally thin gauge rubber backing is extruded or sheeted on the well known special mills i.e. two roll mills capable of yielding backing of this thickness. Also, the sheet may be split to give the desired thickness for the backing.

It should be appreciated that some rubber product manufactures want their appliques to be of specific colors such as the usual gold, white, blue, red and yellow, and the well-known pigments may be used to give the backing strip its desired color and likewise the rubberized ink will be formed with the pigment to give the letters and design the desired colors.

Figure 2:
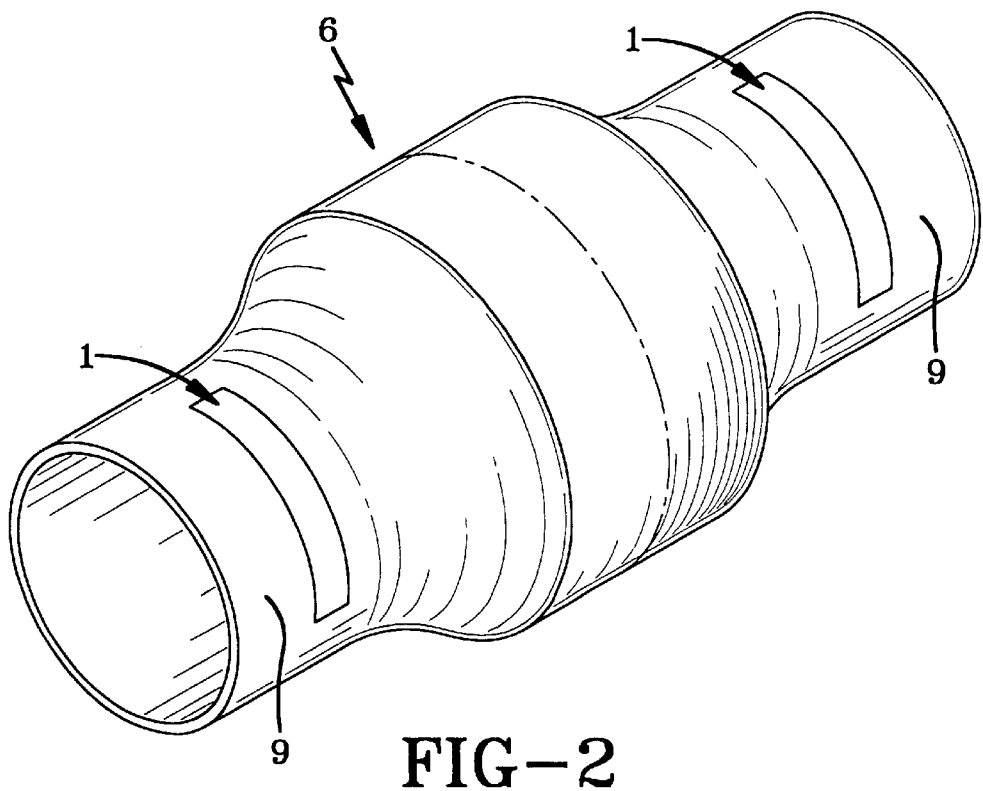
FIG. 2 is a prospective view of one embodiment of a green tire case on the building drum showing the place marked by lights, preferably a vertical and a horizontal light that may cross where the tire builder is to place the positioning mark on the applique and stitch the applique to the case.
Figure 3:
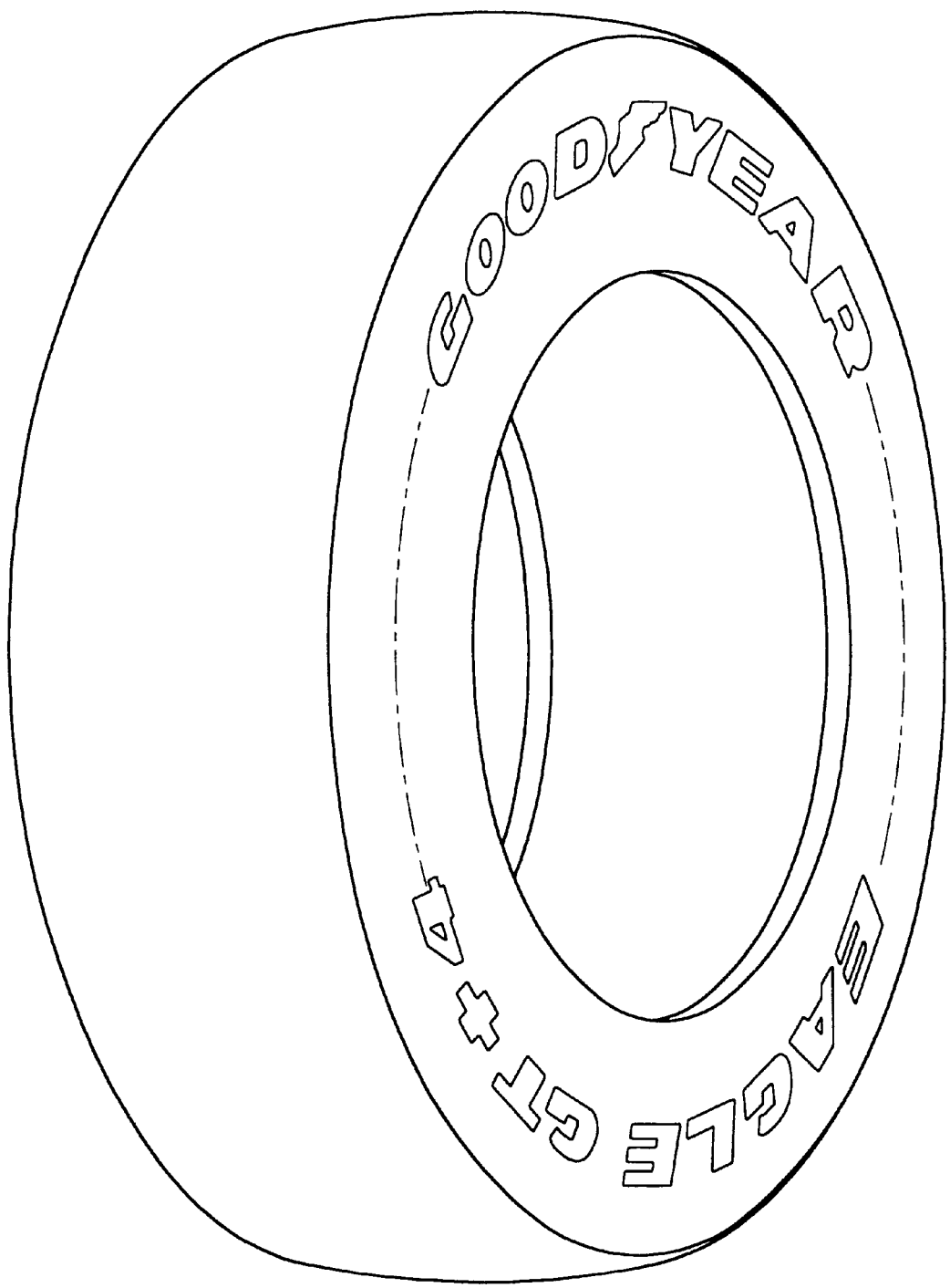
FIG. 3 is a prospective view of the cured tire with the applique thereon.
Figure 4:
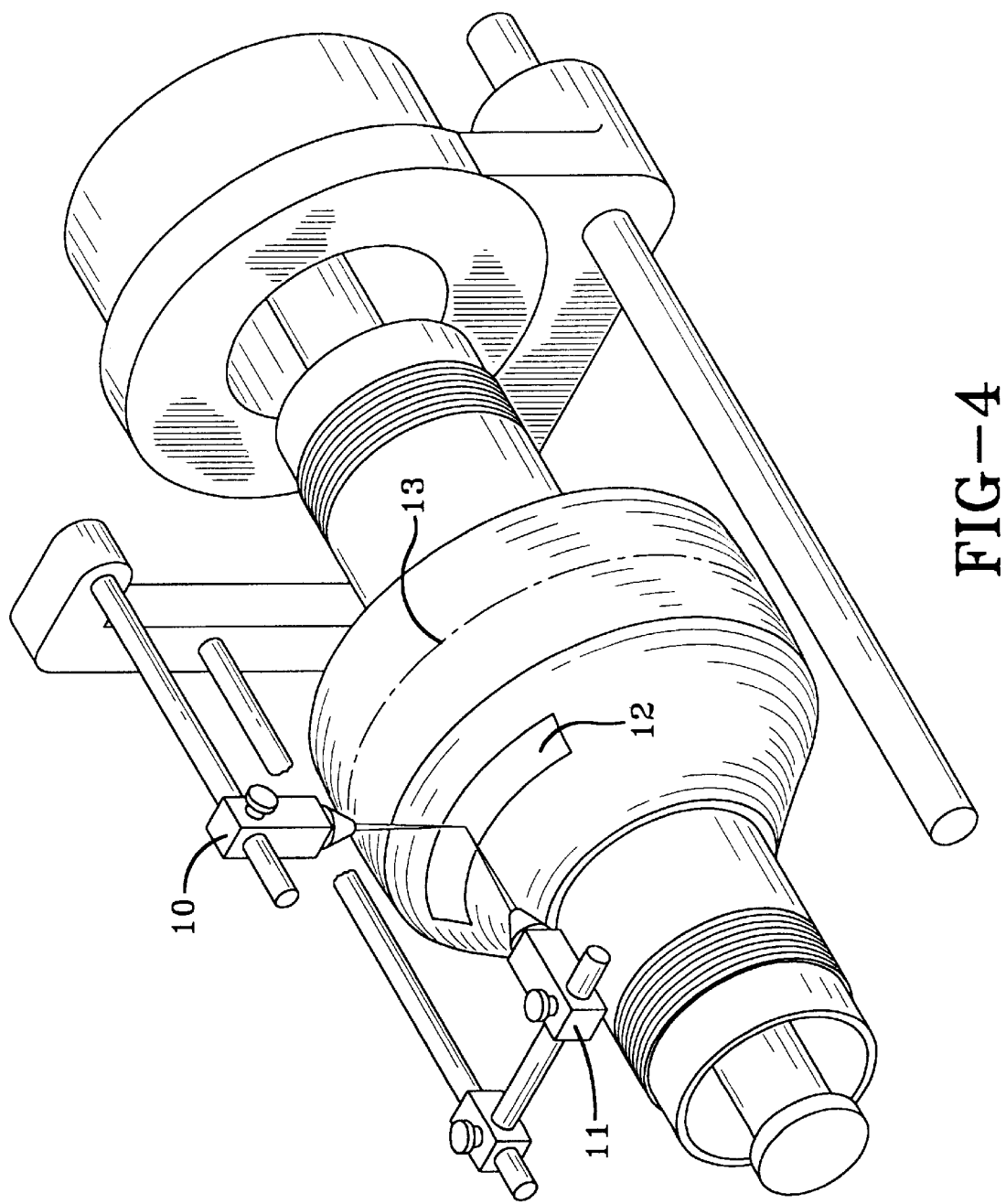
FIG. 4 is a partial prospective view of the tire building drum with a green tire case thereon showing adjustable lights locating at position to receive the label laminate.
Figure 5:
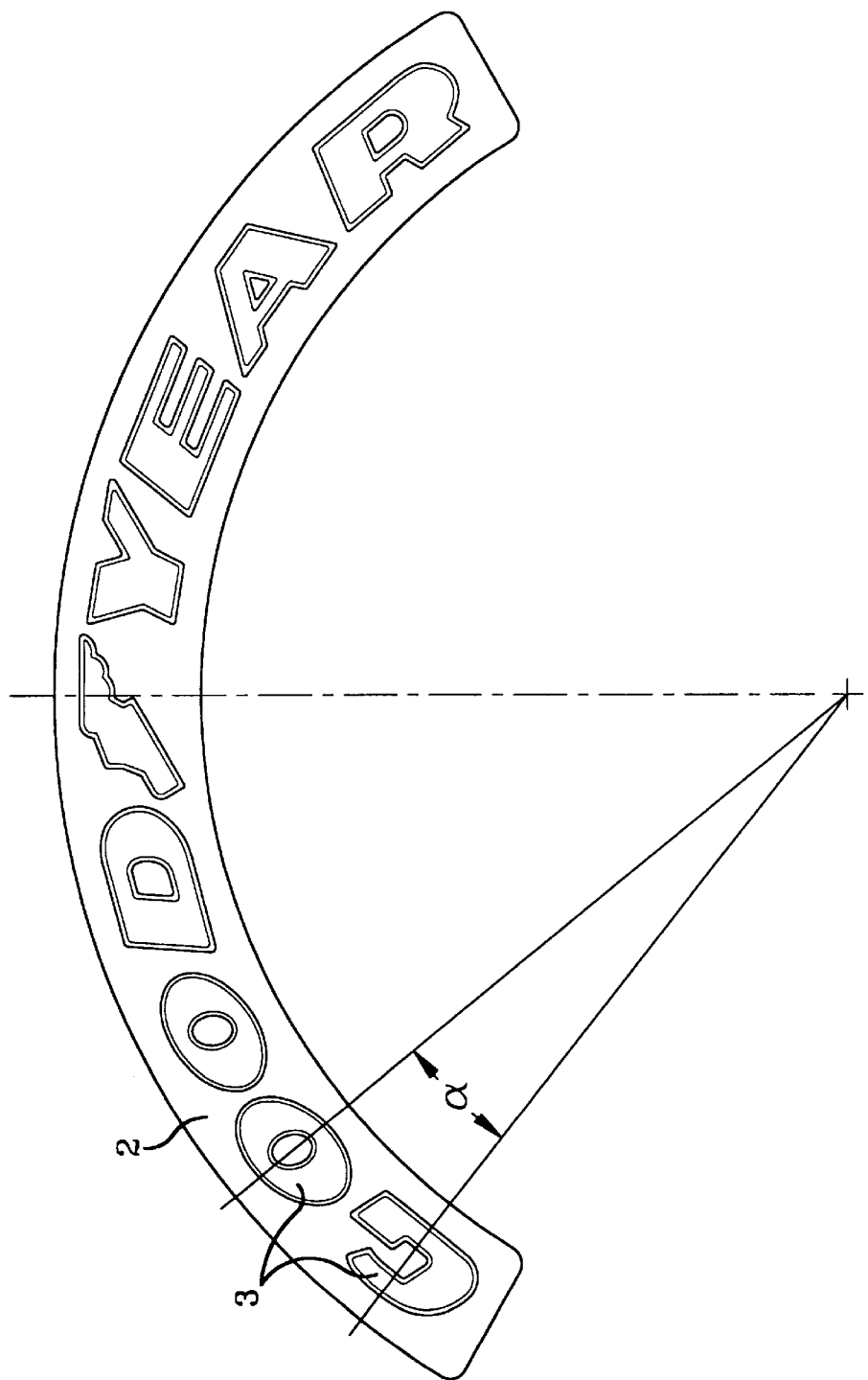
FIG. 5 is a prospective view of the label whose letters are positioned thereon in a distortative print pattern.

FIG. 2 is a green tire case in a flat position on the building drum preferably for building distortative patterned appliques with the position 1 for locating the appliques being marked, preferably by the lights of the building drum assembly of FIG. 4. These lights can be precisely positioned relative to the center line of the tire by the adjustment means 10 and 11. Also, sometimes it is desirable for certain types of race cars with open back ends to have an applique applied on both sides of the tire case as seen in FIG. 2 by numeral 9.

FIG. 4 has the alignment lights 10 and 11 to designate the place to position the positioning indicator 12 relative to where the horizontal 11 and vertical 10 lights intersect relative to the center line 13. Also, the lights have the well known screw type adjustment means to allow the lights to be readily adjusted to desired position on the green tire case.

This invention has been essentially illustrated and described with regard to a pneumatic tire but could be practiced in applying appliques to solid tires, hose, belts, boots and other cured rubber products to give very pleasing clear and distinct marked or designed messages on these cured products. The presence of the film of acetate or polyester prevents excessive flow of the design pattern during cure to yield a remarkable clear pattern even where the rubber products to be shaped as other markings, splices and other construction details that generally result in blemishes or defects in the cured, shaped product. Also, this invention avoids the need to use a precure and a final cure step of the prior art.

Figure 6:
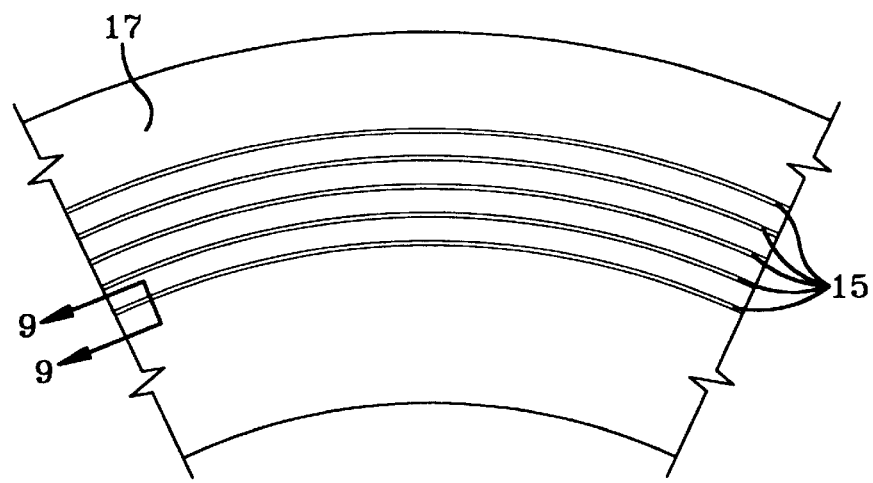
FIG. 6 is a partial section of the inside of a tire mold having a series of grooves placed in its inside surface to contribute a series of embossed ribs to the cured article to help protect the applique.
Figure 9:
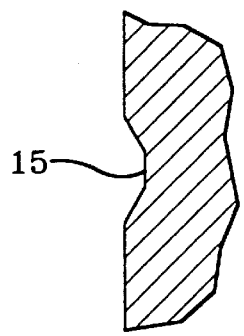
FIG. 9 is a cross-sectional view along line 9—9 of FIG. 6 showing details of the grooves 15.
Figure 7:
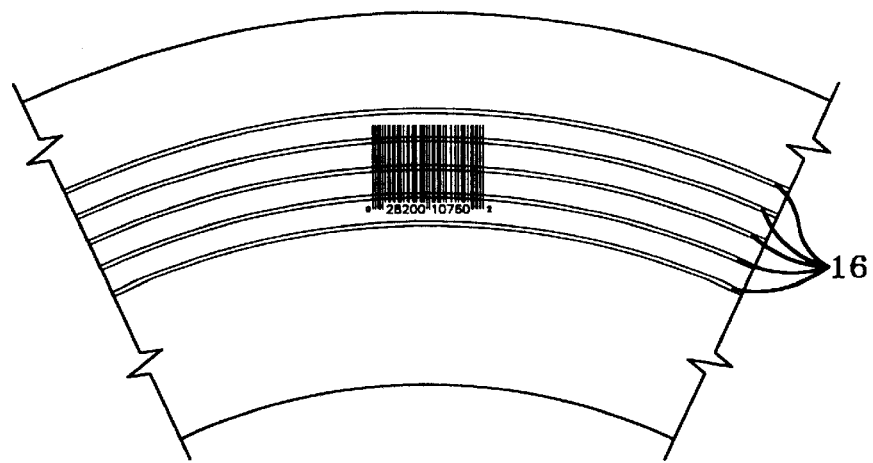
FIG. 7 is a plan view of a bar code having scuff bars to protect the bar code.
Figure 8:
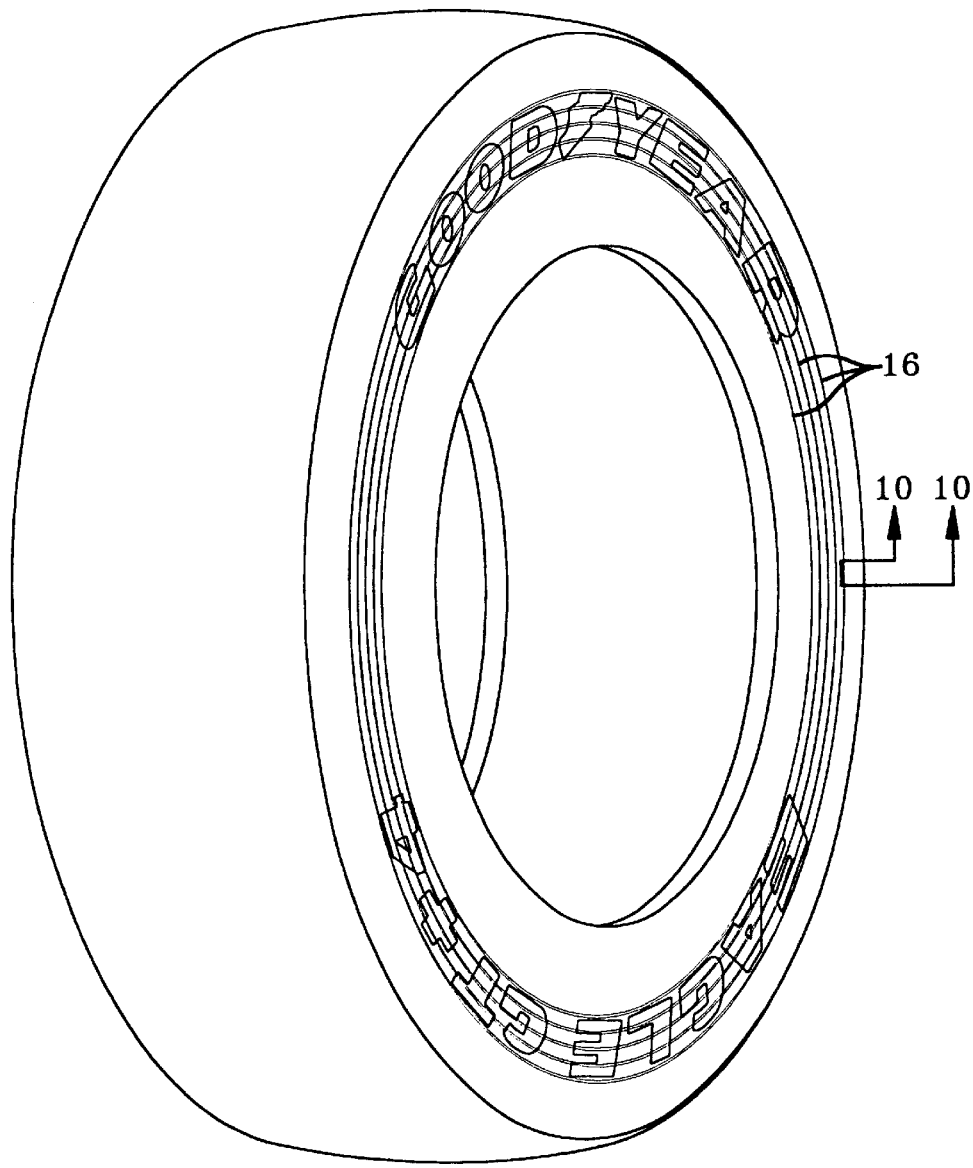
FIG. 8 is a prospective view of a cured tire having a series of embossed ribs resting in the sidewall beneath the lettering on the tire.
Figure 10:
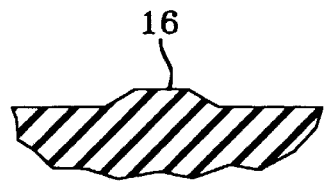
FIG. 10 is a cross-sectional view along line 10,10 of FIG. 8 showing detail of the scuff bars in finished tire mold in the mold of FIG. 6.

Referring to FIG. 6 where a partial section of the inside sidewall of a tire mold is shown numeral 15 designates the grooves therein to mold the scuff ribs 16 shown in FIG. 8. Generally the grooves 15 should be long enough to at least extend the length of the applique. The grooves 16 has a curved surface rather than having sharp corners to extend circumferential of the mold. In general, the grooves have a depth 0.010 to 0.015 inches and preferably 0.012 inches, a groove width at the mold surface of 0.05 to 0.07 and preferably of 0.061 and groove width at top of the groove of 0.015 to 0.025 and preferably 0.020 inches. A green tire case with the bonded applique can be placed in the mold and cured to give a tire-like shape shown in FIG. 8 with the GOODYEAR letters having scuff ribs under the letters.

A regular metal tire mold of the various sizes has the grooves of this invention built therein preferably by the mold builder providing the grooves in the inside surface of the mold. Thus, the master mold used to mold the metal mold has ribs therein corresponding to the grooves of the metal mold.

The mold builder usually will build the master mold with the ribs on the clay or like material by placing a number of circumferential ribs, usually at least 2, to 3, 4, 5 or more depending the size of the tire and type, letter size and a pleasing appearance on outside surface of the master mold between the "S" diameter and the rib flange. The "S" diameter is the point where the tread segments contact the sidewall plate. The ribs will extend in a predetermined pattern usually for 360° around all or most of the master mold sidewall except where the rib is broken to yield a metal mold which will allow trapped air between the applique and the tire sidewall to escape during curing and molding the tire. Usually the distance between circumferential grooves is a dimension of 0.3125 inches as this appears to afford the desired scuff resistance and pleasing appearance.

The number of grooves needed depends on size of the lettering or design. Very large letters will need 4 to 5 or more grooves whereas the small letters may only need 2 to 3 grooves.

Racing tires made in molds as described herein with ribs spaced as described and of the described dimensions can be slid in racing pits and although the applique may be scuffed, the resulting scuffing along the ribs gives the tire the effect it is rolling faster or the vehicle is going faster which tends to hide the detrimental effects of the scuffing. Thus, some associates refer to this as a racy effect.

While certain representative embodiments and details have been shown for the purpose of illustrating the invention, it will be apparent to those skilled in this art that various changes and modifications may be made therein without departing from the spirit or scope of the invention.

What is claimed is:

1. A cured tire having an integral adhered applique both cured in the same cure step in a mold to form spaced apart scuff resistant ribs under the applique on the sidewall of the tire, said applique a thin gauge non-staining compatible rubber backing adhered to said sidewall, a highly stable rubberized ink design adhered to said backing and covered with a removable film before and at the time of removal of the tire from the mold.

2. The tire of claim 1 wherein the scuff ribs is a series of concentric ribs, each rib having the dimension of a raised portion of a ring from a minimum of 0.010 inch deep to 0.015 inch wide.

3. The tire of claim 1 wherein the film is a polyester film covering the ink on the backing strip.

4. The tire of claim 1 wherein the applique contains a readable message.

5. The tire of claim 1 wherein a readable message is a bar code on a polyacetate film.

6. The tire of claim 1 wherein the film is selected from polyester and acetate films.

7. The tire of claim 1 wherein non-staining compatible rubber backing strip is cured by vulcanizing compound(s) in the sidewall on which the strip is located.

* * * * *

UNITED STATES PATENT AND TRADEMARK OFFICE
CERTIFICATE OF CORRECTION

PATENT NO. : 6,391,134 B1  Page 1 of 1
APPLICATION NO. : 08/725212
DATED : May 21, 2002
INVENTOR(S) : Lipovac It is certified that error appears in the above-identified patent and that said Letters Patent is hereby corrected as shown below:

On the title page,
Item [*] delete "0" and insert --1199--.

Signed and Sealed this

Nineteenth Day of December, 2006

JON W. DUDAS
*Director of the United States Patent and Trademark Office*